(12) United States Patent
Noda et al.

(10) Patent No.: US 11,400,421 B2
(45) Date of Patent: Aug. 2, 2022

(54) METHOD OF PRODUCING ZEOLITE MEMBRANE COMPLEX AND ZEOLITE MEMBRANE COMPLEX

(71) Applicant: NGK INSULATORS, LTD., Nagoya (JP)

(72) Inventors: Kenichi Noda, Nagoya (JP); Makoto Miyahara, Tajimi (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 17/444,851

(22) Filed: Aug. 11, 2021

(65) Prior Publication Data

US 2021/0370236 A1 Dec. 2, 2021

Related U.S. Application Data

(63) Continuation of application No. PCT/JP2020/006533, filed on Feb. 19, 2020.

(30) Foreign Application Priority Data

Mar. 25, 2019 (JP) .............................. JP2019-057139

(51) Int. Cl.
*B01D 67/00* (2006.01)
*B01D 53/22* (2006.01)
(Continued)

(52) U.S. Cl.
CPC ....... *B01D 67/0051* (2013.01); *B01D 53/228* (2013.01); *B01D 69/10* (2013.01);
(Continued)

(58) Field of Classification Search
None
See application file for complete search history.

(56) References Cited

U.S. PATENT DOCUMENTS

| 5,194,235 A | 3/1993 | Zones | |
| 2006/0189476 A1* | 8/2006 | Deckman | B01D 71/028 502/60 |

(Continued)

FOREIGN PATENT DOCUMENTS

| JP | 2016-169139 A | 9/2016 |
| WO | 2016/006564 A1 | 1/2016 |

(Continued)

OTHER PUBLICATIONS

International Written Opinion of the International Searching Authority (WO/ISA) (Application No. PCT/JP2020/006533) dated Apr. 28, 2020 (with English translation).

(Continued)

*Primary Examiner* — Jason M Greene
(74) *Attorney, Agent, or Firm* — Burr & Brown, PLLC (57) ABSTRACT

In production of a zeolite membrane complex, a starting material solution containing at least a structure-directing agent and FAU-type zeolite particles having an average particle diameter of 50 to 500 nm is prepared. Then, a support is immersed in the starting material solution to form a zeolite membrane on the support by hydrothermal synthesis, the zeolite membrane being composed of AFX-type zeolite. After that, the structure-directing agent in the zeolite membrane is removed.

10 Claims, 3 Drawing Sheets

(51) Int. Cl.
 *B01D 69/10* (2006.01)
 *B01D 71/02* (2006.01)
 *C01B 39/48* (2006.01)

(52) U.S. Cl.
 CPC ............ *B01D 71/028* (2013.01); *C01B 39/48* (2013.01); *C01P 2004/51* (2013.01); *C01P 2004/62* (2013.01)

(56) References Cited

U.S. PATENT DOCUMENTS

| 2017/0189862 | A1* | 7/2017 | Imasaka | B01D 53/228 |
| 2017/0291135 | A1 | 10/2017 | Noda | |
| 2017/0296980 | A1* | 10/2017 | Noda | B01D 71/028 |
| 2017/0296983 | A1 | 10/2017 | Noda | |
| 2017/0348679 | A1 | 12/2017 | Naraki | |
| 2018/0093897 | A1* | 4/2018 | Chen | C01B 39/48 |
| 2020/0001250 | A1 | 1/2020 | Miyahara et al. | |
| 2020/0101419 | A1 | 4/2020 | Noda et al. | |

FOREIGN PATENT DOCUMENTS

| WO | 2016/121887 A1 | 8/2016 |
| WO | 2016/121888 A1 | 8/2016 |
| WO | 2016/121889 A1 | 8/2016 |
| WO | 2016/125850 A1 | 8/2016 |
| WO | 2018/180243 A1 | 10/2018 |
| WO | 2018/225792 A1 | 12/2018 |

OTHER PUBLICATIONS

International Search Report and Written Opinion (Application No. PCT/JP2020/006533) dated Apr. 28, 2020.

\* cited by examiner

METHOD OF PRODUCING ZEOLITE MEMBRANE COMPLEX AND ZEOLITE MEMBRANE COMPLEX

CROSS-REFERENCE TO RELATED APPLICATION

The present application is a continuation application of International Application No. PCT/JP2020/006533 filed on Feb. 19, 2020, which claims priority to Japanese Patent Application No. 2019-057139 filed on Mar. 25, 2019. The contents of these applications are incorporated herein by reference in their entirety.

BACKGROUND OF THE INVENTION

1. Field of the Invention

The present invention relates to a method of producing a zeolite membrane complex and a zeolite membrane complex.

2. Description of Related Art

Currently, methods of synthesizing zeolites of various structures are known. For example, International Publication No. 2018/225792 (Document 1) describes synthesis of an AFX-type zeolite membrane using a starting material solution which does not contain FAU-type zeolite powder. International Publication No. 2018/180243 (Document 2) discloses a method of synthesizing an AFX-type zeolite membrane by depositing seed crystals of FAU-type zeolite on a support. The specification of U.S. Pat. No. 5,194,235 (Document 3) discloses a method of producing AFX-type zeolite (SSZ-16) powder using FAU-type zeolite (Y-type zeolite) powder as a starting material. International Publication No. 2016/121887 (Document 4) and International Publication No. 2016/121888 (Document 5) disclose a method of forming an AFX-type zeolite membrane on a porous support by depositing AFX-type zeolite powder as seed crystals on the support and performing hydrothermal synthesis in a starting material solution for synthesis of the AFX-type zeolite powder.

Meanwhile, in the AFX-type zeolite membrane obtained by the method of Document 1, the crystallinity of AFX-type zeolite is low and the durability tends to be insufficient, because the starting material solution which does not contain FAU-type zeolite powder is used. In the production method of Document 2, it is necessary to deposit the seed crystals of the FAU-type zeolite on the support, and thus, the production of the zeolite membrane complex may be complicated. Additionally, in the production method of Document 2, since the AFX-type zeolite membrane is synthesized from the seed crystals of FAU-type zeolite, some of the FAU-type zeolite may remain in the AFX-type zeolite membrane and an AFX-type zeolite single-phase membrane may not be obtained. On the other hand, the production method disclosed in Document 3 relates to AFX-type zeolite powder and is not suitable for forming an AFX-type zeolite membrane. Hence, if an AFX-type zeolite membrane is formed on the surface of the support as in Documents 4 and 5 using the method of producing AFX-type zeolite powder as in Document 3, it is difficult to appropriately form the zeolite membrane because, when performing the hydrothermal synthesis by immersing the support in the starting material solution containing the Y-type zeolite powder, the Y-type zeolite powder tends to settle on the bottom of the container in which the starting material solution is stored. Therefore, a zeolite membrane composed of AFX-type zeolite with high crystallinity is required.

SUMMARY OF THE INVENTION

The present invention is intended for a method of producing a zeolite membrane complex, and it is an object of the present invention to provide a zeolite membrane composed of AFX-type zeolite with high crystallinity.

The method of producing a zeolite membrane complex according to a preferable embodiment of the present invention includes a) preparing a starting material solution containing at least a structure-directing agent and FAU-type zeolite particles having an average particle diameter of 50 to 500 nm, b) immersing a support in the starting material solution to form a zeolite membrane on the support by hydrothermal synthesis, the zeolite membrane being composed of AFX-type zeolite, and c) removing the structure-directing agent in the zeolite membrane.

According to the present invention, it is possible to provide a zeolite membrane composed of AFX-type zeolite with high crystallinity.

Preferably, the method of producing a zeolite membrane complex further includes depositing seed crystals of AFX-type zeolite on the support before the operation b).

Preferably, the starting material solution in the operation a) further contains silicon source and alkali source.

Preferably, the FAU-type zeolite particles are composed of Y-type zeolite or X-type zeolite.

Preferably, the average particle diameter of the FAU-type zeolite particles is in a range of 100 to 400 nm.

Preferably, in volume-based particle diameter distribution of the starting material solution, (D90−D10)/D50 is 3 or less.

Preferably, the support is porous.

Preferably, the support is an alumina sintered compact, a mullite sintered compact, or a titania sintered compact.

The present invention is also intended for a zeolite membrane complex. The zeolite membrane complex according to a preferable embodiment of the present invention includes a support and a zeolite membrane provided on the support, the zeolite membrane being composed of AFX-type zeolite. In a cross section of the zeolite membrane which is perpendicular to a surface thereof, maximum and minimum values of thickness of the zeolite membrane in an area with a width of 10 μm in a direction along the surface are represented as A and B, respectively, and an evaluation value obtained by ((A−B)/(A+B)) is 0.04 or more and 0.70 or less.

Preferably, $CF_4$ gas permeance of the zeolite membrane complex is 10 nmol/m$^2$·s·Pa or less.

These and other objects, features, aspects and advantages of the present invention will become more apparent from the following detailed description of the present invention when taken in conjunction with the accompanying drawings.

DETAILED DESCRIPTION OF THE INVENTION

Figure 1:
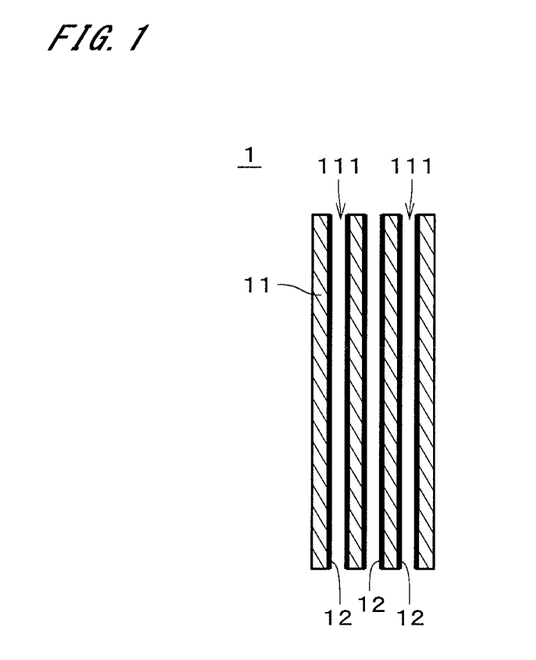
FIG. 1 is a sectional view of a zeolite membrane complex.
Figure 2:
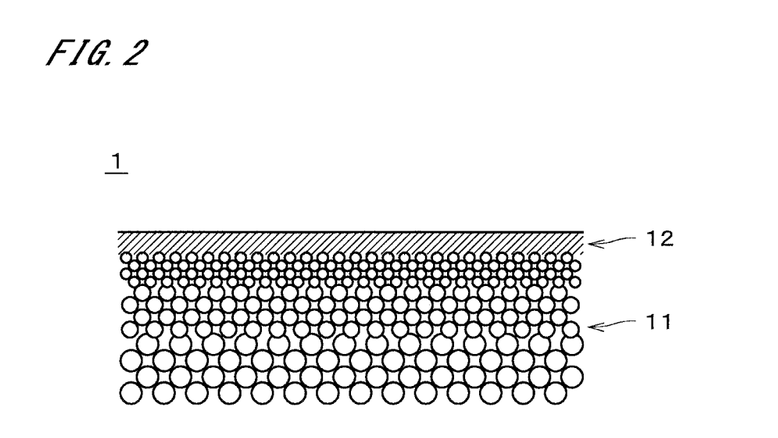
FIG. 2 is a sectional view illustrating part of the zeolite membrane complex in enlarged dimension.

FIG. 1 is a sectional view of a zeolite membrane complex 1. FIG. 2 is a sectional view illustrating part of the zeolite membrane complex 1 in enlarged dimension. The zeolite membrane complex 1 includes a porous support 11 and a zeolite membrane 12 provided on the support 11. The zeolite membrane refers to at least a zeolite formed into a membrane on a surface of the support 11, and does not include zeolite particles that are merely dispersed in an organic membrane. In FIG. 1, the zeolite membrane 12 is illustrated with bold lines. In FIG. 2, the zeolite membrane 12 is indicated by hatching. In FIG. 2, the thickness of the zeolite membrane 12 is illustrated thicker than the actual thickness.

The support 11 is a porous member permeable to gases and liquids. In the example illustrated in FIG. 1, the support 11 is a monolith support obtained by forming a plurality of through holes 111, each extending in a longitudinal direction (i.e., an up-down direction in FIG. 1), in an integral columnar body that is molded integrally. In the example illustrated in FIG. 1, the support 11 has a substantially circular columnar shape. Each through hole 111 (i.e., cell) has, for example, a substantially circular section perpendicular to the longitudinal direction. In FIG. 1, the through holes 111 are illustrated as having a greater diameter than the actual diameter, and a smaller number of through holes 111 than the actual number. The zeolite membrane 12 is formed on the inner surfaces of the through holes 111 and covers substantially the entire inner surfaces of the through holes 111.

The support 11 has a length (i.e., length in the up-down direction in FIG. 1) of, for example, 10 cm to 200 cm. The support 11 has an outer diameter of, for example, 0.5 cm to 30 cm. The distance between the central axes of each pair of adjacent through holes 111 is in the range of, for example, 0.3 mm to 10 mm. The surface roughness (Ra) of the support 11 is in the range of, for example, 0.1 μm to 5.0 μm and preferably in the range of 0.2 μm to 2.0 μm. Alternatively, the support 11 may have a different shape such as a honeycomb shape, a flat plate shape, a tubular shape, a circular cylindrical shape, a circular columnar shape, or a polygonal prism shape. When having a tubular shape or a circular cylindrical shape, the support 11 has a thickness of, for example, 0.1 mm to 10 mm.

Various substances (e.g., a ceramic or a metal) may be employed as the material for the support 11 as long as they have chemical stability in the step of forming the zeolite membrane 12 on the surface. In the present embodiment, the support 11 is formed of a ceramic sintered compact. Examples of the ceramic sintered compact to be selected as the material for the support 11 include alumina, silica, mullite, zirconia, titania, yttria, silicon nitride, and silicon carbide. In the present embodiment, the support 11 is an alumina sintered compact, a mullite sintered compact, or a titania sintered compact. This improves the adhesion between the zeolite membrane 12 and the support 11.

The support 11 may contain an inorganic binder. The inorganic binder may be at least one of titania, mullite, easily sinterable alumina, silica, glass frit, clay minerals, and easily sinterable cordierite.

The support 11 has a mean pore diameter of, for example, 0.01 μm to 70 μm and preferably 0.05 μm to 25 μm. A portion of the support 11 that is located in the vicinity of the surface where the zeolite membrane 12 is formed has a mean pore diameter of 0.01 μm to 1 μm, and preferably 0.05 μm to 0.5 μm. As to a pore size distribution of the support 11 as a whole including the surface and inside of the support 11, D5 is in the range of, for example, 0.01 μm to 50 μm, D50 is in the range of, for example, 0.05 μm to 70 μm, and D95 is in the range of, for example, 0.1 μm to 2000 μm. The portion of the support 11 that is located in the vicinity of the surface where the zeolite membrane 12 is formed has a porosity of, for example, 25% to 50%.

The support 11 has, for example, a multilayer structure in which a plurality of layers having different mean pore diameters are laminated one above another in the thickness direction. The mean pore diameter and sintered particle diameter of a surface layer that includes the surface where the zeolite membrane 12 is formed are smaller than mean pore diameters and sintered particle diameters of other layers different from the surface layer. The surface layer of the support 11 has a mean pore diameter of, for example, 0.01 μm to 1 μm, and preferably 0.05 μm to 0.5 μm. When the support 11 has a multilayer structure, the material for each layer may be any of the materials described above. The materials for the plurality of layers, which form the multilayer structure, may be the same material, or may be different materials.

The zeolite membrane 12 is a porous membrane having micropores. The zeolite membrane 12 can be used as a separation membrane to separate a specific substance from a mixed substance containing a plurality of types of substances by using molecular sieving function. The zeolite membrane 12 is less permeable to other substances than to the specific substance. In other words, the amount by which the other substances permeate through the zeolite membrane 12 is smaller than the amount by which the aforementioned specific substance permeates through the zeolite membrane 12.

The zeolite membrane 12 has a thickness of, for example, 0.05 μm to 30 μm, preferably 0.1 μm to 20 μm, and more preferably 0.5 μm to 10 μm. Separation performance improves as the thickness of the zeolite membrane 12 increases. The permeance increases as the thickness of the zeolite membrane 12 decreases. The surface roughness (Ra) of the zeolite membrane 12 is, for example, 5 μm or less, preferably 2 μm or less, more preferably 1 μm or less, and yet more preferably 0.5 μm or less.

The zeolite membrane 12 is composed of zeolite having an AFX-type structure. In other words, the zeolite membrane 12 is composed of zeolite having a framework type code "AFX" assigned by the International Zeolite Association. The zeolite membrane 12 is typically composed of only AFX-type zeolite, but depending on the production method or the like, the zeolite membrane 12 may contain a small amount (for example, 1 mass % or less) of a substance other than AFX-type zeolite. The maximum number of membered rings in AFX-type zeolite is 8. Here, the mean pore diameter is an arithmetic mean of the major and minor axes of 8-membered ring pore. The 8-membered ring pore refers to a micropore in which eight oxygen atoms exist in a portion where oxygen atoms and T atoms described later are bonded together to form a ring structure. AFX-type zeolite has an intrinsic pore diameter of 0.34 nm×0.36 nm and a mean pore diameter of 0.35 nm. The mean pore diameter of the zeolite membrane 12 is smaller than the mean pore diameter of the portion of the support 11 which is located in the vicinity of the surface where the zeolite membrane 12 is formed.

The zeolite membrane 12 contains, for example, silicon (Si) and aluminum (Al). In this case, AFX-type zeolite is a zeolite in which atoms (T atoms) each located in the center of an oxygen tetrahedron ($TO_4$) of zeolite are composed of Si and Al. Some of the T atoms may be replaced by other elements.

The Si/Al ratio in the zeolite membrane 12 is, for example, one or more and a hundred thousand or less. The Si/Al ratio is preferably 2 or more, more preferably 3 or more, and yet more preferably 5 or more. The Si/Al ratio in the zeolite membrane 12 may be adjusted by, for example, adjusting the composition ratio of Si source and Al source in a starting material solution described later. The zeolite membrane 12 may contain alkali metal or alkaline earth metal. The alkali metal is, for example, sodium (Na) or potassium (K).

The zeolite membrane 12 is a polycrystalline membrane mainly composed of a large number of zeolite crystal grains formed on the surface of the support 11. In the production of the zeolite membrane complex 1 described later, it is possible to increase the crystallinity of the AFX-type zeolite in the zeolite membrane 12. The crystallinity of the AFX-type zeolite can be evaluated from various viewpoints. In one evaluation method, in a cross section of the zeolite membrane 12 which is perpendicular to the surface thereof, maximum and minimum values of thickness of the zeolite membrane 12 in an area with a width of 10 μm in a direction along the surface are represented as A and B, respectively, and a value of $((A-B)/(A+B))$ is obtained. Then, among the above values obtained at twelve different locations, the average value of values (ten values) excluding the maximum value and the minimum value is calculated as a first evaluation value.

Here, when the zeolite constituting the zeolite membrane has high crystallinity and is homogeneous, fine irregularities are formed on the surface of the zeolite membrane. In other words, when the irregularities on the surface of the zeolite membrane are excessively small, the crystallinity of the zeolite is supposed to be low, and when the irregularities are excessively large, the crystallinity of the zeolite is supposed to be inhomogeneous. The above first evaluation value is an index of irregularities on the surface of the zeolite membrane 12, and in the zeolite membrane 12 of the present embodiment, the first evaluation value is 0.04 or more and 0.70 or less (that is, (0.04≤first evaluation value ≤0.70) is satisfied.). When the first evaluation value is within the above range, it can be said that the AFX-type zeolite constituting the zeolite membrane 12 has high crystallinity and is homogeneous. The first evaluation value of the zeolite membrane 12 is preferably 0.05 or more and 0.6 or less, and more preferably 0.07 or more and 0.5 or less.

In another evaluation method of the crystallinity of AFX-type zeolite, $CF_4$ gas permeance of the zeolite membrane 12 when $CF_4$ single component gas is used is determined as a second evaluation value. Since the dynamic molecular diameter of $CF_4$ gas is 0.47 nm and the mean pore diameter of AFX-type zeolite is 0.35 nm, the $CF_4$ gas is a gas that does not easily permeate through the pores of AFX-type zeolite. Here, assuming that the zeolite membrane is dense, if the AFX-type zeolite constituting the zeolite membrane has low crystallinity and homogeneity, $CF_4$ gas permeates through an inhomogeneous portion of the zeolite membrane with low crystallinity. Therefore, it is conceivable that the $CF_4$ gas permeance increases. In the zeolite membrane 12 of the present embodiment, the second evaluation value as the $CF_4$ gas permeance is, for example, 10 nmol/$m^2$·s·Pa or less, and in this case, it can be said that the AFX-type zeolite constituting the zeolite membrane 12 has high crystallinity and is homogeneous. The second evaluation value of the zeolite membrane 12 is preferably 5 nmol/$m^2$·s·Pa or less, and more preferably 3 nmol/$m^2$·s·Pa or less. The second evaluation value is preferably as low as possible, but the lower limit value is, for example, 0.001 nmol/$m^2$·s·Pa.

Figure 3:
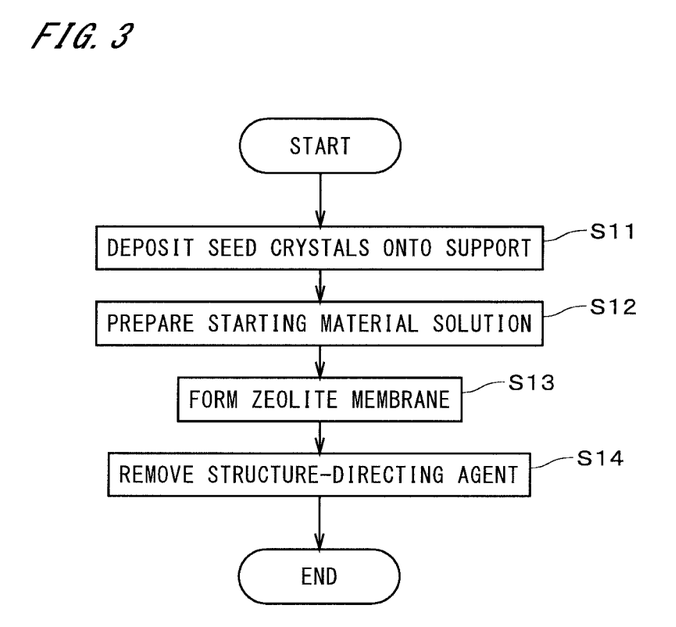
FIG. 3 is a flowchart of production of the zeolite membrane complex.

Next, an example of the procedure for producing the zeolite membrane complex 1 will be described with reference to FIG. 3. In the production of the zeolite membrane complex 1, first, seed crystals for use in the formation of the zeolite membrane 12 are prepared. The seed crystals are, for example, acquired from AFX-type zeolite powder generated by hydrothermal synthesis. This zeolite powder may be used as-is as seed crystals, or may be processed into seed crystals by, for example, pulverization.

Then, the porous support 11 is immersed in a solution in which the seed crystals are dispersed, so that the seed crystals are deposited on the support 11 (step S11). Alternatively, a solution in which the seed crystals are dispersed may be brought into contact with a portion of the support 11 on which the zeolite membrane 12 is desired to be formed, so that the seed crystals are deposited on the support 11. In this way, a seed-crystal-deposited support is prepared. The seed crystals may be deposited by other methods on the support 11.

Further, a starting material solution in which FAU-type zeolite particles and a structure-directing agent (hereinafter, also referred to as an "SDA") are dissolved (or dispersed) in a solvent is prepared (step S12). The starting material solution can also be regarded as a dispersion liquid. The FAU-type zeolite particles have an average particle diameter of 50 to 500 nm. When the average particle diameter of the FAU-type zeolite particles is larger than 500 nm, the FAU-type zeolite particles tend to settle down in the starting material solution. When the average particle diameter of the FAU-type zeolite particles is smaller than 50 nm, the crystallinity of the synthesized AFX-type zeolite tends to be low. By using the fine FAU-type zeolite particles, it is possible to adequately disperse the FAU-type zeolite particles in the starting material solution. In other words, the settlement of the FAU-type zeolite particles can be suppressed. Here, the particle diameter of the FAU-type zeolite particles is not the particle diameter of the primary particles but the particle diameter of the secondary particles. In order to more adequately disperse the FAU-type zeolite particles in the starting material solution while maintaining the crystallinity of the synthesized AFX-type zeolite, the average particle diameter of the FAU-type zeolite particles is preferably in a range of 100 to 400 nm, and more preferably in a range of 120 to 350 nm. The average particle diameter of the FAU-type zeolite particles is the median diameter (D50) in the (volume-based) particle diameter distribution obtained by the laser scattering method.

The (volume-based) particle diameter distribution of the starting material solution satisfies preferably (D90−D10)/D50≤3, more preferably (D90−D10)/D50≤2, and particularly preferably (D90−D10)/D50≤1. Here, D90 is a particle diameter at the point where the particle diameter distribution curve obtained by the laser scattering method intersects a horizontal axis indicating the cumulative 90%, D50 is a particle diameter at the point where the curve intersects a horizontal axis indicating the cumulative 50%, and D10 is a particle diameter at the point where the curve intersects a horizontal axis indicating the cumulative 10%. When the (volume-based) particle diameter distribution of the starting material solution satisfies (D90−D10)/D50≤3, the zeolite membrane 12 composed of AFX-type zeolite having higher crystallinity and homogeneity can be obtained.

The FAU-type zeolite particles may be produced by hydrothermal synthesis, or commercially available FAU-type zeolite particles may be used. Preferred FAU-type zeolite particles are composed of Y-type zeolite or X-type zeolite. This makes it possible to more reliably form the zeolite membrane 12 having high crystallinity by hydrothermal synthesis described later. In the starting material solution, a plurality of types of FAU-type zeolite particles having different compositions may be mixed. As the solvent of the starting material solution, for example, water, or alcohol such as ethanol may be used. The SDA contained in the starting material solution is, for example, an organic substance. As the SDA, for example, 1,4-diazabicyclo[2.2.2]octane-C4-diquat dibromide, 1,4-diazabicyclo[2.2.2]octane-C4-diquat hydroxide, 1,3-di(1-adamantyl)imidazolium bromide, 1,3-di(1-adamantyl)imidazolium hydroxide, N,N,N',N'-tetraethylbicyclo[2.2.2]oct-7-ene-2,3:5,6-dipyrrolidinium hydroxide, or the like may be used. In addition to the FAU-type zeolite particles, other Si source and alkali source are preferably mixed in the starting material solution. The starting material solution may be further mixed with Al source or the like. As the Si source, for example, colloidal silica, fumed silica, silicon alkoxide, sodium silicate, and the like may be used. As the Al source, for example, sodium aluminate, aluminum hydroxide, aluminum alkoxide, alumina sol, and the like may be used. As the alkali source, for example, sodium hydroxide, potassium hydroxide, sodium silicate, sodium aluminate, and the like may be used.

The support 11 with the seed crystals deposited thereon is immersed in the starting material solution. Then, AFX-type zeolite is grown by hydrothermal synthesis using the seed crystals as nuclei, to form a zeolite membrane 12 composed of the AFX-type zeolite on the support 11 (step S13). The temperature of the hydrothermal synthesis is preferably in the range of 110 to 200° C. The hydrothermal synthesis time is preferably in the range of 5 to 100 hours. As mentioned previously, in the starting material solution, fine FAU-type zeolite particles are adequately dispersed, and the AFX-type zeolite is homogeneously grown from almost all seed crystals deposited on the support 11. Typically, most of the zeolite crystal grains located on the surface of the zeolite membrane 12 are each a single layer crystal grain that is continuous in the normal direction of the surface of the support 11, except for the seed crystals.

After the hydrothermal synthesis is completed, the support 11 and the zeolite membrane 12 are rinsed with pure water. After the rinsing, the support 11 and the zeolite membrane 12 are dried at, for example, 100° C. After the support 11 and the zeolite membrane 12 are dried, the zeolite membrane 12 is subjected to heat treatment in an oxidizing gas atmosphere, to thereby burn and remove the SDA in the zeolite membrane 12 (step S14). This allows micropores in the zeolite membrane 12 to come through the membrane. Preferably, the SDA is removed substantially completely. The heating temperature at the time of the removal of the SDA is in the range of, for example, 350 to 700° C. The heating time is in the range of, for example, 10 to 200 hours. The oxidizing gas atmosphere is an atmosphere containing oxygen, e.g., in the air. Through the above-described processing, the zeolite membrane complex 1 is obtained. In the production of the zeolite membrane complex 1 of FIG. 3, the process of depositing the seed crystals on the support 11 (step S11) may be omitted, and the zeolite membrane 12 may be directly formed on the support 11 in step S13.

In the aforementioned production of the zeolite membrane complex 1, when forming the zeolite membrane 12 on the support 11 by hydrothermal synthesis, a starting material solution containing at least a structure-directing agent and FAU-type zeolite particles having an average particle diameter of 50 to 500 nm is prepared. In the starting material solution, the FAU-type zeolite particles are adequately dispersed, and thus, settlement of the particles can be suppressed. As a result, the zeolite membrane 12 composed of AFX-type zeolite having high crystallinity can be formed by hydrothermal synthesis.

Since the average particle diameter of the FAU-type zeolite particles is in a range of 100 to 400 nm, the FAU-type zeolite particles can be more adequately dispersed in the starting material solution and the zeolite membrane 12 having high crystallinity can be formed more reliably. The seed crystals of AFX-type zeolite are deposited on the support 11 before forming the zeolite membrane 12. This makes it possible to easily form the homogeneous zeolite membrane 12. Since the FAU-type zeolite particles are composed of Y-type zeolite or X-type zeolite, the zeolite membrane 12 having high crystallinity can be formed more reliably.

Next, an example of producing the zeolite membrane complex 1 will be described.

Example 1

First, a monolith support was immersed in a solution in which AFX-type zeolite crystals were dispersed as seed crystals, and the seed crystals of the AFX-type zeolite were deposited on the inner surfaces of the through holes of the support.

Y-type zeolite powder (product name: HSZ-320NAA, manufactured by Tosoh Corporation) was put into pure water so as to have a content of 7 to 8 mass %, and pulverized by a ball mill for 3 days, to thereby prepare a dispersion liquid of Y-type zeolite particles. The particle diameter of the Y-type zeolite particles was 150 nm in terms of median diameter. A starting material solution with a composition of $12.5SiO_2:1Al_2O_3:15Na_2O:2.8SDA:3000H_2O$ was prepared by dissolving in pure water colloidal silica, Y-type zeolite particles, sodium hydroxide, and 1,4-diazabicyclo[2.2.2]octane-C4-diquat dibromide as an SDA (structure-directing agent).

The support with the seed crystals deposited thereon was immersed in the starting material solution and hydrothermally synthesized at 170° C. for 20 hours. A zeolite membrane was thereby formed on the support. After the hydrothermal synthesis, the support and the zeolite membrane were sufficiently washed with pure water, and then dried at 100° C. As a result of the X-ray diffraction measurement, it was found that the obtained zeolite membrane was formed of AFX-type zeolite. The thickness of the zeolite membrane was approximately 2 μm. The first evaluation value obtained by $((A-B)/(A+B))$ was 0.09.

After drying the support and the zeolite membrane, the $N_2$ (nitrogen) gas permeance of the zeolite membrane was measured. As described above, the zeolite membrane was formed on the inner surfaces of the through holes of the support. Both ends of the support were sealed with glass, and the support was placed in a housing (see FIG. 4 described later). In other words, the zeolite membrane complex was disposed in the housing. Sealing members were arranged between both ends of the support and the housing. In this state, the $N_2$ gas was introduced into each through hole of the support, and the $N_2$ gas that permeated through the zeolite membrane was collected from a hole provided in the housing. The pressure of the introduced $N_2$ gas (gauge pressure) was 0.3 MPaG, and the pressure of the permeate $N_2$ gas (gauge pressure) was 0 MPaG. As a result, the $N_2$ permeance of the zeolite membrane was 0.005 nmol/m²·s·Pa or less. From this, it was confirmed that the zeolite membrane had a denseness for practical use.

After that, the zeolite membrane was subjected to heat treatment at 500° C. for 20 hours so as to burn and remove the SDA, to thereby cause micropores in the zeolite membrane to come through the membrane.

Next, the $CF_4$ (tetrafluoromethane) gas permeance of the zeolite membrane was measured. The $CF_4$ gas permeation test was carried out in the same manner as the $N_2$ gas permeation test described above. The pressure of the introduced $CF_4$ gas (gauge pressure) was 0.3 MPaG, and the pressure of the permeate $CF_4$ gas (gauge pressure) was 0 MPaG. As a result, the $CF_4$ gas permeance (second evaluation value) of the zeolite membrane was 3 nmol/$m^2$·s·Pa. From this, it was confirmed that the zeolite membrane had sufficient performance for practical use.

Example 2

A zeolite membrane was produced in the same manner as in Example 1 except for the usage of the dispersion liquid of Y-type zeolite particles with a median diameter of 220 nm which were produced by hydrothermal synthesis using seed crystals with a primary particle diameter of 10 to 20 nm which were obtained by pulverization with a bead mill. As a result of the X-ray diffraction measurement, it was found that the obtained zeolite membrane was formed of AFX-type zeolite. The thickness of the zeolite membrane was approximately 3 μm. The first evaluation value obtained by ((A−B)/(A+B)) was 0.30.

After drying the support and the zeolite membrane, the $N_2$ gas permeance of the zeolite membrane was measured. The $N_2$ permeance of the zeolite membrane was 0.005 nmol/$m^2$·s·Pa or less. From this, it was confirmed that the zeolite membrane had a denseness for practical use. After that, the zeolite membrane was subjected to heat treatment at 500° C. for 20 hours so as to burn and remove the SDA, to thereby cause micropores in the zeolite membrane to come through the membrane.

Next, the $CF_4$ gas permeation test was carried out in the same manner as in Example 1. As a result, the $CF_4$ gas permeance (second evaluation value) of the zeolite membrane was 5 nmol/$m^2$·s·Pa. From this, it was confirmed that the zeolite membrane had sufficient performance for practical use.

Example 3

A zeolite membrane was produced in the same manner as in Example 1 except that a starting material solution with a composition of 12.5$SiO_2$:1$Al_2O_3$:15$Na_2O$:2.8SDA:1000$H_2O$ and a monolith support without seed crystals were used and the hydrothermal synthesis was carried out at 170° C. for 50 hours. As a result of the X-ray diffraction measurement, it was found that the obtained zeolite membrane was formed of AFX-type zeolite. The thickness of the zeolite membrane was approximately 5 μm. The first evaluation value obtained by ((A−B)/(A+B)) was 0.66.

After drying the support and the zeolite membrane, the $N_2$ gas permeance of the zeolite membrane was measured. The $N_2$ permeance of the zeolite membrane was 0.005 nmol/$m^2$·s·Pa or less. From this, it was confirmed that the zeolite membrane had a denseness for practical use. After that, the zeolite membrane was subjected to heat treatment at 500° C. for 20 hours so as to burn and remove the SDA, to thereby cause micropores in the zeolite membrane to come through the membrane.

Next, the $CF_4$ gas permeation test was carried out in the same manner as in Example 1. As a result, the $CF_4$ gas permeance (second evaluation value) of the zeolite membrane was 9 nmol/$m^2$·s·Pa. From this, it was confirmed that the zeolite membrane had sufficient performance for practical use.

Comparative Example 1

A zeolite membrane was produced in the same manner as in Example 1 except that a starting material solution with a composition of 17.5$SiO_2$:1$Al_2O_3$:10$Na_2O$:2.8SDA:6000$H_2O$ was prepared by dissolving in pure water colloidal silica, sodium aluminate, sodium hydroxide, and 1,4-diazabicyclo[2.2.2]octane-C4-diquat dibromide. As a result of the X-ray diffraction measurement, it was found that the obtained zeolite membrane was formed of AFX-type zeolite. The thickness of the zeolite membrane was approximately 3 The first evaluation value obtained by ((A−B)/(A+B)) was 0.03.

After drying the support and the zeolite membrane, the $N_2$ gas permeance of the zeolite membrane was measured. The $N_2$ permeance of the zeolite membrane was 0.005 nmol/$m^2$·s·Pa or less. From this, it was confirmed that the zeolite membrane had a denseness for practical use. After that, the zeolite membrane was subjected to heat treatment at 500° C. for 20 hours so as to burn and remove the SDA, to thereby cause micropores in the zeolite membrane to come through the membrane.

Next, the $CF_4$ gas permeation test was carried out in the same manner as in Example 1. As a result, the $CF_4$ gas permeance (second evaluation value) of the zeolite membrane was 21 nmol/$m^2$·s·Pa. From this, it was confirmed that the zeolite membrane had lower performance than those of Examples 1 to 3.

As described above, in each of Examples 1 to 3 in which the FAU-type zeolite particles having an average particle diameter of 50 to 500 nm were contained in the starting material solution, the first evaluation value was 0.04 or more and 0.70 or less. In contrast, in Comparative Example 1 in which the FAU-type zeolite particles were not contained in the starting material solution, the first evaluation value was less than 0.04. Further, in each of Examples 1 to 3, the second evaluation value was enough smaller than that of Comparative Example 1. Therefore, it was conceivable that the zeolite membranes of Examples 1 to 3 had higher crystallinity and were more homogeneous in comparison with the zeolite membrane of Comparative Example 1.

Figure 4:
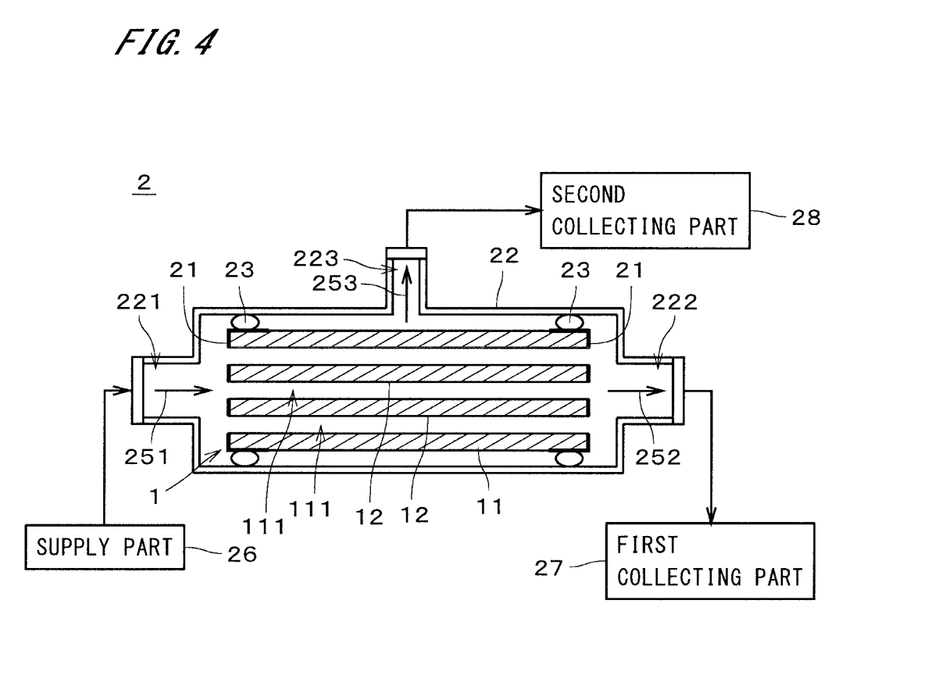
FIG. 4 is a diagram illustrating a separation apparatus.
Figure 5:
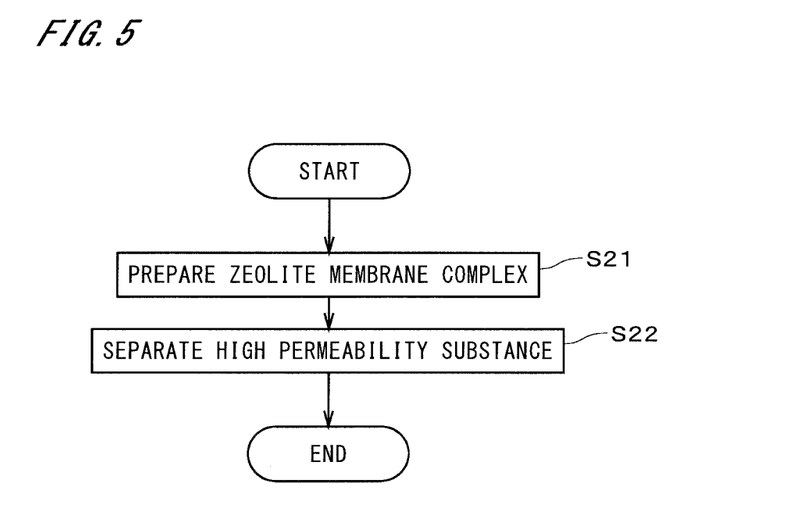
FIG. 5 is a flowchart of separation of a mixed substance by the separation apparatus.

Next, separation of a mixed substance using the zeolite membrane complex 1 will be described with reference to FIGS. 4 and 5. FIG. 4 is a diagram illustrating a separation apparatus 2. FIG. 5 is a flowchart of the separation of the mixed substance performed by the separation apparatus 2.

The separation apparatus 2 supplies a mixed substance containing a plurality of types of fluids (i.e., gases or liquids) to the zeolite membrane complex 1 and allowing a substance with high permeability in the mixed substance to permeate through the zeolite membrane complex 1 so as to separate that substance from the mixed substance. Separation in the separation apparatus 2 may be performed, for example, in order to extract a substance with high permeability from a mixed substance, or in order to concentrate a substance with low permeability.

The mixed substance (i.e., mixed fluid) may be a mixed gas containing a plurality of types of gases, may be a mixed liquid containing a plurality of types of liquids, or may be a gas-liquid two-phase fluid containing both a gas and a liquid.

The mixed substance contains at least one of, for example, hydrogen ($H_2$), helium (He), nitrogen ($N_2$), oxygen ($O_2$), water ($H_2O$), water vapor ($H_2O$), carbon monoxide (CO), carbon dioxide ($CO_2$), nitrogen oxide, ammonia ($NH_3$), sulfur oxide, hydrogen sulfide ($H_2S$), sulfur fluoride, mercury (Hg), arsine ($AsH_3$), hydrogen cyanide (HCN), carbonyl sulfide (COS), C1 to C8 hydrocarbons, organic acid, alcohol, mercaptans, ester, ether, ketone, and aldehyde.

The nitrogen oxide is a compound of nitrogen and oxygen. The above-described nitrogen oxide is, for example, a gas called NOx such as nitric oxide (NO), nitrogen dioxide ($NO_2$), nitrous oxide (also referred to as dinitrogen monoxide) ($N_2O$), dinitrogen trioxide ($N_2O_3$), dinitrogen tetroxide ($N_2O_4$), dinitrogen pentoxide ($N_2O_5$), or the like.

The sulfur oxide is a compound of sulfur and oxygen. The above-described sulfur oxide is, for example, a gas called $SO_X$ such as sulfur dioxide ($SO_2$), sulfur trioxide ($SO_3$), or the like.

The sulfur fluoride is a compound of fluorine and sulfur. The above-described sulfur fluoride is, for example, disulfur difluoride (F—S—S—F, S=$SF_2$), sulfur difluoride ($SF_2$), sulfur tetrafluoride ($SF_4$), sulfur hexafluoride ($SF_6$), disulfur decafluoride ($S_2F_{10}$), or the like.

The C1 to C8 hydrocarbons are hydrocarbons with one or more and eight or less carbon atoms. The C3 to C8 hydrocarbons may be any one of a linear-chain compound, a side-chain compound, and a ring compound. Further, the C2 to C8 hydrocarbons may either be a saturated hydrocarbon (i.e., in which there is no double bond and triple bond in a molecule), or an unsaturated hydrocarbon (i.e., in which there is a double bond and/or a triple bond in a molecule). The C1 to C4 hydrocarbons are, for example, methane ($CH_4$), ethane ($C_2H_6$), ethylene ($C_2H_4$), propane ($C_3H_8$), propylene ($C_3H_6$), normal butane ($CH_3(CH_2)_2CH_3$), isobutane ($CH(CH_3)_3$), 1-butene ($CH_2$=$CHCH_2CH_3$), 2-butene ($CH_3CH$=$CHCH_3$), or isobutene ($CH_2$=$C(CH_3)_2$).

The above-described organic acid is carboxylic acid, sulfonic acid, or the like. The carboxylic acid is, for example, formic acid ($CH_2O_2$), acetic acid ($C_2H_4O_2$), oxalic acid ($C_2H_2O_4$), acrylic acid ($C_3H_4O_2$), benzoic acid ($C_6H_5COOH$), or the like. The sulfonic acid is, for example, ethanesulfonic acid ($C_2H_6O_3S$) or the like. The organic acid may either be a chain compound or a ring compound.

The above-described alcohol is, for example, methanol ($CH_3OH$), ethanol ($C_2H_5OH$), isopropanol (2-propanol) ($CH_3CH(OH)CH_3$), ethylene glycol ($CH_2(OH)CH_2(OH)$), butanol ($C_4H_9OH$), or the like.

The mercaptans are an organic compound having hydrogenated sulfur (SH) at the terminal end thereof, and are a substance also referred to as thiol or thioalcohol. The above-described mercaptans are, for example, methyl mercaptan ($CH_3SH$), ethyl mercaptan ($C_2H_5SH$), 1-propanethiol ($C_3H_7SH$), or the like.

The above-described ester is, for example, formic acid ester, acetic acid ester, or the like.

The above-described ether is, for example, dimethyl ether (($CH_3)_2O$), methyl ethyl ether ($C_2H_5OCH_3$), diethyl ether (($C_2H_5)_2O$), or the like.

The above-described ketone is, for example, acetone (($CH_3)_2CO$), methyl ethyl ketone ($C_2H_5COCH_3$), diethyl ketone (($C_2H_5)_2CO$), or the like.

The above-described aldehyde is, for example, acetaldehyde ($CH_3CHO$), propionaldehyde ($C_2H_5CHO$), butanal (butyraldehyde) ($C_3H_7CHO$), or the like.

In the following description, it is assumed that the mixed substance separated by the separation apparatus 2 is a mixed gas containing a plurality of types of gases.

The separation apparatus 2 includes the zeolite membrane complex 1, a sealing part 21, a housing 22, two seal members 23, a supply part 26, a first collecting part 27, and a second collecting part 28. The zeolite membrane complex 1, the sealing part 21, and the seal members 23 are placed in the housing 22. The supply part 26, the first collecting part 27, and the second collecting part 28 are disposed outside the housing 22 and connected to the housing 22.

The sealing part 21 is members mounted on both ends of the support 11 in the longitudinal direction (i.e., left-right direction in FIG. 4) and for covering and sealing both end faces of the support 11 in the longitudinal direction and portions of the outer peripheral face in the vicinity of the end faces. The sealing part 21 prevents the inflow and outflow of gases through the end faces of the support 11. The sealing part 21 is, for example, plate-like members formed of glass or a resin. The material and shape of the sealing part 21 may be appropriately changed. Since the sealing part 21 has a plurality of openings that overlap the through holes 111 of the support 11, both ends of each through hole 111 of the support 11 in the longitudinal direction are not covered by the sealing part 21. This allows the inflow and outflow of gases or the like into/from the through holes 111 through both the ends.

Although there is no particular limitation on the shape of the housing 22, the housing 22 is, for example, a tubular member having a substantially circular cylindrical shape. The housing 22 is formed of, for example, stainless steel or carbon steel. The longitudinal direction of the housing 22 is substantially parallel to the longitudinal direction of the zeolite membrane complex 1. One end of the housing 22 in the longitudinal direction (i.e., left-side end in FIG. 4) has a supply port 221, and the other end thereof has a first exhaust port 222. A peripheral face of the housing 22 has a second exhaust port 223. The supply port 221 is connected to the supply part 26. The first exhaust port 222 is connected to the first collecting part 27. The second exhaust port 223 is connected to the second collecting part 28. The internal space of the housing 22 is a sealed space isolated from the space around the housing 22.

The two seal members 23 are disposed around the entire circumference between the outer peripheral face of the zeolite membrane complex 1 and the inner peripheral face of the housing 22 in the vicinity of both ends of the zeolite membrane complex 1 in the longitudinal direction. Each seal member 23 is a substantially circular ring-shaped member formed of a material impermeable to gases. For example, the seal members 23 are O-rings formed of a resin having flexibility. The seal members 23 are in tight contact with the outer peripheral face of the zeolite membrane complex 1 and the inner peripheral face of the housing 22 around the entire circumference. In the example illustrated in FIG. 4, the seal members 23 are in tight contact with the outer peripheral face of the sealing part 21 and are indirectly in tight contact with the outer peripheral face of the zeolite membrane complex 1 via the sealing part 21. The part between the seal member 23 and the outer peripheral face of the zeolite membrane complex 1 and the part between the seal member 23 and the inner peripheral face of the housing 22 are sealed so as to almost or completely disable the passage of gases.

The supply part 26 supplies a mixed gas to the internal space of the housing 22 through the supply port 221. For example, the supply part 26 is a blower or pump that feeds the mixed gas toward the housing 22 by pressure-feeding. The blower or pump includes a pressure regulator that regulates the pressure of the mixed gas supplied to the housing 22. The first collecting part 27 and the second collecting part 28 are, for example, reservoirs that store gases derived from the housing 22, or blowers or pumps that feed gases.

In the separation of a mixed gas, the aforementioned separation apparatus 2 is provided to prepare the zeolite membrane complex 1 (step S21). Then, a mixed gas containing a plurality of types of gases having different permeability to the zeolite membrane 12 is supplied from the supply part 26 to the internal space of the housing 22. For example, the main component of the mixed gas is $CO_2$ and $CH_4$. The mixed gas may contain any gas other than $CO_2$ and $CH_4$. The pressure (i.e., introduction pressure) of the mixed gas supplied from the supply part 26 into the internal space of the housing 22 is in the range of, for example, 0.1 MPa to 20.0 MPa. The temperature for separation of the mixed gas is in the range of, for example, 10° C. to 150° C.

The mixed gas supplied from the supply part 26 into the housing 22 is introduced from the left end of the zeolite membrane complex 1 in the drawing into each through hole 111 of the support 11 as indicated by an arrow 251. A gas having high permeability (e.g., $CO_2$; hereinafter referred to as a "high permeability substance") in the mixed gas permeates through the zeolite membrane 12 provided on the inner surface of each through hole 111 and the support 11, and is led out from the outer peripheral face of the support 11. In this way, the high permeability substance is separated from a gas having low permeability (e.g., $CH_4$; hereinafter referred to as a "low permeability substance") in the mixed gas (step S22). A gas (hereinafter referred to as a "permeate substance") led out from the outer peripheral face of the support 11 is collected by the second collecting part 28 through the second exhaust port 223 as indicated by an arrow 253. The pressure (i.e., permeation pressure) of the gas collected by the second collecting part 28 through the second exhaust port 223 is, for example, approximately one atmospheric pressure (0.101 MPa).

In the mixed gas, a gas (hereinafter, referred to as "non-permeate substance") other than the gas that has permeated through the zeolite membrane 12 and the support 11 passes through each through hole 111 of the support 11 from the left side to the right side in the drawing and is collected by the first collecting part 27 through the first exhaust port 222 as indicated by an arrow 252. The pressure of the gas collected by the first collecting part 27 through the first exhaust port 222 is, for example, substantially the same pressure as the introduction pressure. In addition to the aforementioned low permeability substance, the non-permeate substance may also include the high permeability substance that has not permeated through the zeolite membrane 12. The separation apparatus 2 of FIG. 4 can appropriately separate the high permeability substance using the zeolite membrane 12 composed of AFX-type zeolite having high crystallinity.

In the zeolite membrane complex 1 and the production thereof described above, various modifications can be made.

The zeolite membrane complex 1 may further include a function layer or a protective layer laminated on the zeolite membrane 12, additionally to the support 11 and the zeolite membrane 12. Such a function layer or a protective layer may be an inorganic membrane such as a zeolite membrane, a silica membrane, a carbon membrane, or the like or an organic membrane such as a polyimide membrane, a silicone membrane, or the like. Further, a substance that is easy to adsorb specific molecules such as $CO_2$ may be added to the function layer or the protective layer laminated on the zeolite membrane 12.

In the above embodiment, since the support 11 is porous, the zeolite membrane complex 1 suitable for the separation apparatus 2 can be obtained, but depending on the design of the zeolite membrane complex 1, the support 11 may be non-porous, that is, it may be a member having almost no pores.

In the separation apparatus 2 and the separation method, any substance other than the substances exemplarily shown in the above description may be separated from the mixed substance.

The configurations of the preferred embodiments and variations described above may be appropriately combined as long as there are no mutual inconsistencies.

While the invention has been shown and described in detail, the foregoing description is in all aspects illustrative and not restrictive. It is therefore understood that numerous modifications and variations can be devised without departing from the scope of the invention.

INDUSTRIAL APPLICABILITY

The zeolite membrane complex according to the present invention can be used, for example, as a gas separation membrane. The zeolite membrane complex can also be used as a separation membrane for substances other than gases, an adsorbent membrane for various substances, or the like in various fields in which zeolite is used.

REFERENCE SIGNS LIST

1 Zeolite membrane complex
11 Support
12 Zeolite membrane
S11 to S14, S21, S22 Step

The invention claimed is:

1. A method of producing a zeolite membrane complex, comprising:
   a) preparing a starting material solution containing at least a structure-directing agent and FAU-type zeolite particles having an average particle diameter of 50 to 500 nm;
   b) immersing a support in said starting material solution to form a zeolite membrane on said support by hydrothermal synthesis, said zeolite membrane being composed of AFX-type zeolite; and
   c) removing said structure-directing agent in said zeolite membrane.

2. The method of producing a zeolite membrane complex according to claim 1, further comprising
   depositing seed crystals of AFX-type zeolite on said support before said operation b).

3. The method of producing a zeolite membrane complex according to claim 1, wherein
   said starting material solution in said operation a) further contains silicon source and alkali source.

4. The method of producing a zeolite membrane complex according to claim 1, wherein
   said FAU-type zeolite particles are composed of Y-type zeolite or X-type zeolite.

5. The method of producing a zeolite membrane complex according to claim 1, wherein
   the average particle diameter of said FAU-type zeolite particles is in a range of 100 to 400 nm.

6. The method of producing a zeolite membrane complex according to claim 1, wherein
   in volume-based particle diameter distribution of said starting material solution, (D90−D10)/D50 is 3 or less.

7. The method of producing a zeolite membrane complex according to claim 1, wherein
   said support is porous.

8. The method of producing a zeolite membrane complex according to claim 1, wherein
said support is an alumina sintered compact, a mullite sintered compact, or a titania sintered compact.

9. A zeolite membrane complex, comprising:
a support; and
a zeolite membrane provided on said support, said zeolite membrane being composed of AFX-type zeolite, wherein
in a cross section of said zeolite membrane which is perpendicular to a surface thereof, maximum and minimum values of thickness of said zeolite membrane in an area with a width of 10 μm in a direction along said surface are represented as A and B, respectively, and an evaluation value obtained by $((A-B)/(A+B))$ is 0.04 or more and 0.70 or less.

10. The zeolite membrane complex according to claim 9, wherein
$CF_4$ gas permeance of said zeolite membrane complex is 10 nmol/m$^2$·s·Pa or less.

* * * * *